(12) United States Patent
Lu et al.

(10) Patent No.: US 7,737,238 B2
(45) Date of Patent: Jun. 15, 2010

(54) RESIN SUITABLE FOR POWDER COATING COMPOSITIONS

(75) Inventors: Szuping Lu, Canton, MI (US); Rahul Holla, Saline, MI (US); Benjamin Morley, Adrian, MI (US)

(73) Assignee: Anderson Development Co., Adrian, MI (US)

( * ) Notice: Subject to any disclaimer, the term of this patent is extended or adjusted under 35 U.S.C. 154(b) by 0 days.

(21) Appl. No.: 12/073,328

(22) Filed: Mar. 4, 2008

(65) Prior Publication Data

US 2009/0227752 A1 Sep. 10, 2009

(51) Int. Cl.
C08F 20/32 (2006.01)
C08F 220/32 (2006.01)
(52) U.S. Cl. .................. 526/328; 526/273; 526/319
(58) Field of Classification Search ............. 526/319, 526/328.5
See application file for complete search history.

(56) References Cited

U.S. PATENT DOCUMENTS

| | | | |
|---|---|---|---|
| 3,752,870 A | 8/1973 | Labana | |
| 5,407,707 A * | 4/1995 | Simeone et al. | 427/410 |
| 5,514,755 A * | 5/1996 | Fenn et al. | 525/329.5 |
| 5,663,240 A | 9/1997 | Simeone et al. | |
| 6,268,433 B1 | 7/2001 | Barkac et al. | |
| 6,605,681 B1 * | 8/2003 | Villalobos et al. | 526/319 |
| 6,649,700 B2 * | 11/2003 | Yabuta et al. | 525/208 |
| 6,656,531 B2 * | 12/2003 | Yoshioka et al. | 427/386 |
| 2002/0137872 A1 | 9/2002 | Schneider et al. | |
| 2003/0044626 A1 | 3/2003 | Kim et al. | |
| 2003/0077469 A1 | 4/2003 | Chasser et al. | |
| 2003/0212216 A1 * | 11/2003 | Mizoguchi et al. | 525/329.7 |
| 2004/0265494 A1 | 12/2004 | Lu et al. | |
| 2005/0025987 A1 | 2/2005 | Humbert et al. | |

FOREIGN PATENT DOCUMENTS

| | | |
|---|---|---|
| EP | 1 055 694 A2 | 11/2000 |
| EP | 1 362 899 A2 | 11/2003 |
| JP | 2001 131462 | 5/2001 |
| JP | 2003 321641 | 11/2003 |
| JP | 2003 321643 | 11/2003 |
| JP | 2004 050104 | 2/2004 |
| JP | 2007 091795 | 4/2007 |
| WO | WO 98/42765 | 10/1998 |
| WO | WO 99/33889 | 7/1999 |
| WO | WO 00/12581 | 3/2000 |
| WO | WO 00/49100 | 8/2000 |
| WO | WO 02/36700 A1 | 5/2002 |
| WO | WO 02/094948 A1 | 11/2002 |
| WO | WO 2005/108513 A | 11/2005 |
| WO | WO 2005/108514 A1 | 11/2005 |

OTHER PUBLICATIONS

International Search Report and Written Opinion issued May 13, 2009 in corresponding PCT/US2009/001317.

* cited by examiner

*Primary Examiner*—David Wu
*Assistant Examiner*—Vu Nguyen
(74) *Attorney, Agent, or Firm*—Buchanan Ingersoll & Rooney PC

(57) ABSTRACT

A resin suitable for powder coating including glycidyl acrylate or glycidyl methacrylate. The resin may also contain a high Tg and hydrophobicity monomer. Typical powder coatings made from the resin show improved powder coating handling, and particularly acid etch resistance.

21 Claims, No Drawings

RESIN SUITABLE FOR POWDER COATING COMPOSITIONS

BACKGROUND

Since the 1970s, powder coatings have been a focus of development. In recent years, the use of powder coatings has grown rapidly worldwide due to its environmental friendly nature and tremendous improvement in resins, additives, and equipment technologies.

A glycidyl methacrylate (GMA) based powder coating is a powder coating system often selected for use from among other powder coating systems such as polyester, epoxy, and hybrids thereof, etc. The GMA based powder coatings have been used for 30 years since the first application patent published in 1973 (U.S. Pat. No. 3,752,870). The GMA powder coating has a general reputation for good smoothness, crystal clarity, chemical resistance, high gloss, and excellent outdoor durability. In fact, up to date the GMA powder coating is the only powder coating system selected for automotive full-body clear topcoat applications. GMA powder coatings have also been widely used in aluminum wheel coating, outdoor furniture, garden equipment, light fixtures, and certain industrial applications where extended weatherability is required.

Although GMA powder coatings have been used in many high performance applications, as described above, an improvement in the powder coating appearance and acid etch resistance is needed to meet current higher automotive standards. One manner most people have selected to improve powder coating appearance is to reduce the powder coating resin melt viscosity from existing systems. However, by doing that, the resin glass transition temperature was also reduced and the powder coating resins and final formulated powder suffered physical storage stability. Using refrigerated shipping and storage became a common practice in some high performance GMA powder coating applications. The refrigerated shipping and storage increase the cost for these applications.

Furthermore, to attempt to improve final coating properties such as mar and chemical resistances, many people increased the contents of the functional monomer, GMA, in GMA powder coating resin compositions. However, the increase of GMA functional monomer contents in resin compositions typically results in the increase of secondary hydroxyl groups generated during final curing of the powder coatings, as shown in the following GMA powder coating curing reaction scheme:

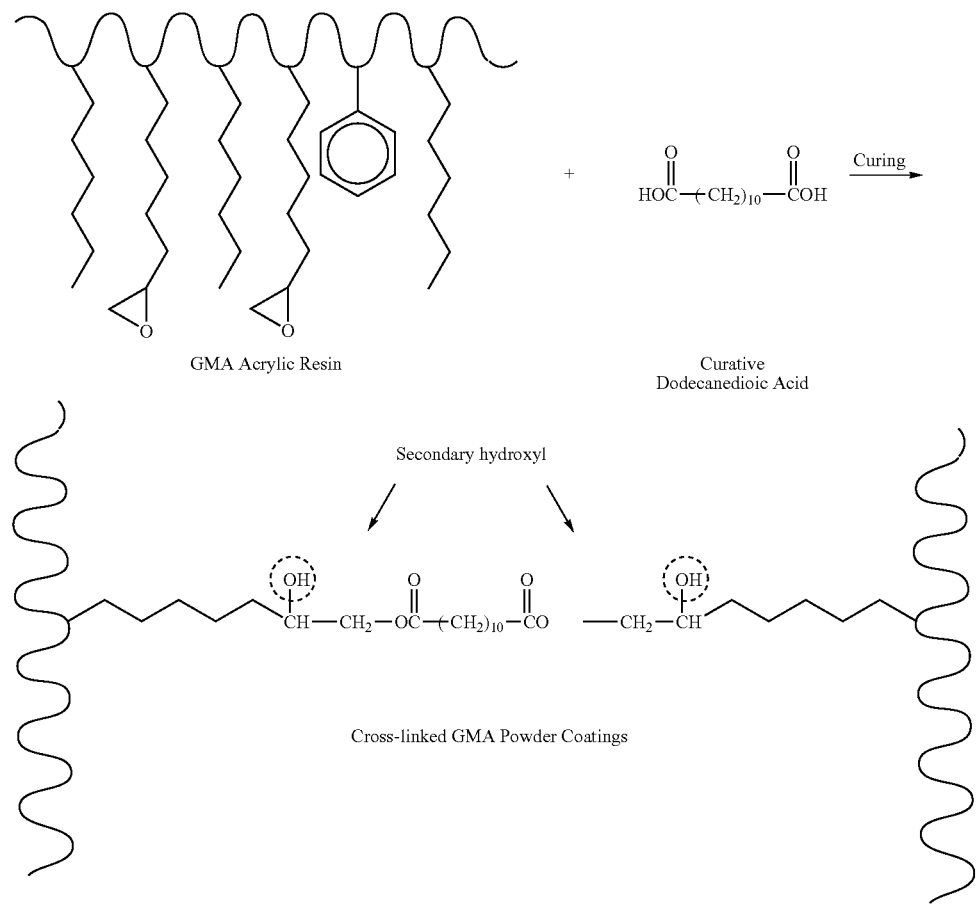

The secondary hydroxyl groups generated during the GMA powder coating curing reaction increased the hydrophilic characteristics in a final coating which typically reduced the GMA powder coating's humidity resistance, acid etch resistance, and filiform corrosion resistance. In the typical practice of GMA powder coatings, the higher weight % GMA monomer-containing resins give less acid etch resistance. Although the above secondary hydroxyl group could be further reacted with some other secondary curing mechanism, most of them are not efficient due to the hindering from the first highly cross-linked network.

Therefore, there is a high demand to provide a novel GMA powder coating resin with high cross-linking density without reducing the acid etch or other corrosion resistance. Embodiments of this disclosure provide novel GMA powder coating resin compositions which give a good GMA powder coating, good melt flow, and give a final coating with excellent smoothness, chemical resistance, and mar resistance with improved acid etch resistance. Further, it is anticipated that embodiments of this disclosure will provide improved corrosion resistance, such as filiform corrosion.

SUMMARY

With a view to increase the acceptance of GMA powder coatings in high performance automotive applications such as full body clear top coats and aluminum wheel coatings, embodiments of the present disclosure have a GMA powder coating resin composition designed for better handling and improved coating properties.

In one embodiment, the disclosure provides a resin suitable for powder coating prepared from monomers. The resin may comprise from 20 to 55 weight % of glycidyl acrylate (GA) or glycidyl methacrylate (GMA), preferably 25 to 50 weight %, and from 3 to 20 weight % of at least one selected from the group consisting of isobutyl methacrylate (IBMA), isobornyl acrylate (IBOA) and isobornyl methacrylate (IBOMA), preferably 5 to 15 weight %, and from 25 to 65 weight % of at least one copolymerizable ethylenically unsaturated monomer, preferably 30 to 50 weight %. The resin may have an f/M (functionality per molecule) value greater than 14, preferably 14 to 22, more preferably 15 to 20.

The disclosure also provides embodiments of a resin with a calculated glass transition temperature ($Tg_c$) of from 60 to 90° C., preferably 65 to 85° C.

The disclosure also provides embodiments of a resin with a calculated solubility parameter ($SP_c$) of from 8.8 to 9.15, preferably 9.0 to 9.12.

The disclosure also provides embodiments of a resin with a weight average molecular weight (Mw) of from 3,000 to 12,000, preferably 4,000 to 10,000.

The disclosure also provides embodiments of a resin with an epoxy equivalent weight (EEQ) of from 250 to 720, preferably 280 to 600.

The disclosure also provides embodiments of a resin with a particle size of from 100 microns to 6 mm.

The disclosure also provides embodiments of a resin prepared from glycidyl methacrylate, isobornyl methacrylate, and copolymerizable ethylenically unsaturated monomers comprising methyl methacrylate and styrene.

DETAILED DESCRIPTION

One embodiment of the disclosure provides a method of using specific monomers which have a homopolymer Tg higher than 45° C. and a solubility parameter less than 8.5 in a GA and/or GMA powder coating resin composition designed to give the resulting resin a low melt viscosity without reducing Mw, while obtaining improved mar and acid etch resistance. Further, an embodiment of the disclosure provides a method of using specific monomers which have a homopolymer Tg higher than 45° C. and a solubility parameter less than 8.5 in a GA and/or GMA powder coating resin composition design to give the resulting resin a high Tg without increasing Mw, while obtaining improved mar and acid etch resistance.

One aspect of this disclosure is to select free radical polymerizable monomers with the consideration of individual monomer-homopolymer Tg and solubility parameter to balance the final GA and/or GMA powder coating resin of a copolymer with a $Tg_c$ at range of 60-90° C. and a solubility parameter ($SP_c$) at 8.8-9.15 $(cal/cm^3)^{1/2}$.

In the above resin a calculated copolymer $Tg_c$ is defined as:

$$\frac{1}{Tg_c^\infty} = \frac{w1}{Tg_1^\infty} + \frac{w2}{Tg_2^\infty} + \frac{w3}{Tg_3^\infty} + ...$$

Where:
$Tg_c^\infty$: the asymptotic value of the Tg of copolymer at infinite MW;
$Tg_1^\infty, Tg_2^\infty, Tg_3^\infty$: the homopolymer Tg of each monomer;
w1, w2, w3: weight ratio of monomers in copolymer;
In the above resin a copolymer calculated $SP_c$ is defined as:

$$SP_c = \left(\frac{W1 \times SP1}{d1} + \frac{W2 \times SP2}{d2} + \frac{W3 \times SP3}{d3} + ...\right) \Big/ \left(\frac{W1}{d1} + \frac{W2}{d2} + \frac{W3}{d3} + ...\right)$$

Where:
$SP_c$: The solubility parameter of the GMA resin copolymer.
W1, W2. W3, . . . : Weight ratio of each individual monomer.
d1, d2, d3, . . . : Specific density of each individual monomer.
SP1, SP2, SP3, . . . : Solubility parameter of homopolymer of each individual monomer.

The monomer Tg and solubility parameter used for the above calculations can be found, for example, in a monomer supplier's data sheet or published literature such as "Polymer Handbook" (4th Edition, John Wiley, New York, 1999).

The following Table 1 gives a list of monomer-homopolymer Tg and SP of commonly used free radical polymerizable monomers.

TABLE 1

| Monomer | Homopolymer Tg, ° C. | Homopolymer SP, $(cal/cm^3)^{1/2}$ | Specific Gravity |
|---|---|---|---|
| Butyl acrylate | −56 | 9.0 | 0.894 |
| Butyl methacrylate | 20 | 8.8 | 0.896 |
| Ethyl methacrylate | 65 | 9.0 | 0.914 |
| Glycidyl methacrylate | 46 | 9.45 | 1.073 |
| n-Octyl methacrylate | −20 | 8.4 | 0.890 |
| Isobornyl acrylate | 94 | 8.2 | 0.987 |
| Isobornyl methacrylate | 170 | 8.1 | 0.979 |
| Isobutyl methacrylate | 48 | 7.2 | 0.884 |
| Lauryl methacrylate | −65 | 8.2 | 0.872 |
| Methyl methacrylate | 105 | 9.5 | 0.994 |

TABLE 1-continued

| Monomer | Homopolymer Tg, °C. | Homopolymer SP, (cal/cm$^3$)$^{1/2}$ | Specific Gravity |
|---|---|---|---|
| Stearyl methacrylate | 38 | 7.8 | 0.864 |
| Styrene | 100 | 8.7 | 0.9048 |

The selection of a lower SP value monomer could provide the resulting powder coating resin with a higher hydrophobicity to give better humidity, and corrosion resistances in final powder coatings. However, most of these lower SP monomers often have a lower homopolymer Tg such as n-octyl methacrylate, lauryl methacrylate, and stearyl methacrylate. It is difficult to obtain a GA and/or GMA powder coating resin with a suitable Tg at a desired resin molecular weight when using such low SP monomers. The f/M is calculated from Mw/EEQ. The Mw may be determined by Gel Permeation Chromatography (GPC). The EEQ may be determined by the acetic acid/perchloric acid method using a Mettler Autotitrator DL25/Mettler 20 ml Buret DV920. The f/M can have a major effect on powder coating gel-time and mar resistance.

On the other hand, most of higher Tg (>50° C.) monomers such as methyl methacrylate and ethyl methacrylate have a higher solubility parameter than desired.

With the GA and/or GMA powder coating application requirements in mind, a method of the disclosure utilizes the resin copolymer $Tg_c$ equation, copolymer $SP_c$ equation, and ratios of monomer compositions to obtain the most preferable ranges of GMA powder coating compositions for better powder coating handling and improved coating appearance, mar resistance, and acid etch resistance.

The isobutyl methacrylate, isobornyl methacrylate, and isobornyl acrylate are three of the most preferable monomers to be included in GA and/or GMA powder coating resin compositions to fit the above described desired handling and coating properties.

A resin according to an embodiment of the present disclosure is suitable for preparation of powder coating compositions. The resin may comprise from 20 to 55 weight % of glycidyl acrylate (GA) or glycidyl methacrylate (GMA), preferably 25-50 weight %, and from 3 to 20 weight % of at least one selected from the group consisting of isobutyl methacrylate (IBMA), isobornyl acrylate (IBOA) and isobornyl methacrylate (IBOMA), preferably 5-15 weight %, and from 25 to 65 weight % of at least one copolymerizable ethylenically unsaturated monomer, preferably 30-50 weight %.

The glycidyl (meth)acrylate monomer, in particular glycidyl methacrylate, wherein $R_8$ is methyl and $R_9$ is methylene (CAS # 106-91-2), and glycidyl acrylate, wherein $R_8$ is hydrogen and $R_9$ is methylene, (CAS # 106-90-1), can be obtained commercially from the Dow Chemical Company (Midland, Mich.), NOF Corporation (Ebisu, Shiboya-ku, Tokyo), Mitsubishi Rayon Co. (Konan, Minato-ku, Tokyo), Mitsubishi Gas Chemical Co. (Marunaouchi, Chiyodako, Tokyo). In the alternative, the glycidyl (meth)acrylate monomer can be prepared under reaction conditions known to those of skill in the art.

Examples of copolymerizable ethylenically unsaturated monomers which may be suitable for use in the present disclosure include, but are not limited to, alkyl esters of acrylic acid or methacrylic acid, optionally together with other ethylenically unsaturated monomers. Suitable acrylic or methacrylic esters include: methyl acrylate, ethyl acrylate, propyl acrylate, n-butyl acrylate, isobutyl acrylate, tert-butyl acrylate, 2-ethylhexyl acrylate, lauryl acrylate, methyl methacrylate, ethyl methacrylate, propyl methacrylate, n-butyl methacrylate, tert-butyl methacrylate, isodecyl methacrylate, tridecyl methacrylate, lauryl methacrylate, stearyl methacrylate, 2-ethylhexyl methacrylate, and so forth and mixtures thereof. Cyclic esters such as cyclohexyl acrylate and cyclohexyl methacrylate, benzyl acrylate and/or methacrylate, as well as hydroxyalkyl esters such as 2-hydroxyethyl acrylate or methacrylate, 2-hydroxypropyl acrylate or methacrylate, and hydroxybutyl acrylate and methacrylate may also be used. In addition, vinyl monomers, vinyl aliphatic or vinyl aromatic monomers, such as acrylonitrile, methacrylonitrile, styrene, vinyl acetate, vinyl propionate, α-methylstyrene, N-vinylpyrrolidone, vinyl neodecanoate and vinyl toluene can be used. Also, acrylamides, for example, acrylamide and dimethylacrylamide; hydroxyalkyl esters of acrylic acid and methacrylic acid, for example, hydroxyethyl acrylate, hydroxypropyl acrylate, hydroxyethyl methacrylate, and hydroxypropyl methacrylate; and dialkyl esters of unsaturated dibasic acids can be used.

Preferably, the isobutyl methacrylate, isobornyl methacrylate, and/or isobornyl acrylate in GA and/or GMA powder coating resin compositions results in a resin with an EEQ of 250-720, a Mw of 3,000-12,000, a $Tg_c$ of 60-90° C., a $SP_c$ of 8.8-9.15 (cal/cm$^3$)$^{1/2}$, and an f/M>14.

More preferably, the isobutyl methacrylate, isobornyl methacrylate, and/or isobornyl acrylate in GA and/or GMA powder coating resin compositions results in a resin with an EEQ of 280-600, a Mw of 4,000-10,000, a $Tg_c$ of 65-85° C., a $SP_c$ of 9.0-9.12 (cal/cm$^3$)$^{1/2}$, and an f/M of 14-22.

Embodiments of a resin preferably have a particle size of from 100 microns to 6 mm.

Embodiments of a resin preferably are prepared from glycidyl methacrylate, isobornyl methacrylate, and copolymerizable ethylenically unsaturated monomers comprising methyl methacrylate and styrene.

Embodiments of the resin of the present disclosure with preferable Tgc, SPc, EEQ, Mw, and f/M ranges can be prepared by the well known free radical polymerization process as described in the art.

A 500-3000 ppm of one aminoether specified in the U.S. Pat. No. 6,670,411 may be found to be effective to stabilize the above isobutyl methacrylate, isobornyl methacrylate, or isobornyl acrylate containing GA and/or GMA powder coating resins. The final resin products produced with the addition of 500-3000 ppm of aminoether additive may have narrower melt index range for the whole production batch and the products may also have lower residual monomers which come from the thermal decomposition while in high temperature devolatilization process.

The following examples illustrate various aspects of embodiments of the present disclosure. It is to be understood that the present disclosure is defined by the appended claims and not the specific details of the examples.

The coating compositions and processes to make powder coatings from the powder coating compositions comprising the GMA based resins of the present disclosure are the same as for conventional GMA based powder coatings. Illustrative compositions and conditions are set forth in U.S. Pat. Nos. 5,270,416, 5,407,747, 5,710,214, 5,939,195, 6,077,608, 6,277,917, 6,359,067, and 6,479,588, the contents of which are herein incorporated by reference in their entirety.

Powder coating composition formed from resins of the present disclosure comprise the GMA based resins as described herein and an appropriate curing agent or curative. Suitable curing agents for the GMA based resins of the present disclosure are curing agents that are used for conventional GMA powder coatings. These curing agents are known to those of skill in the art. Suitable curing agents include polycarboxylic acids, polycarboxylic acid anhydrides, polyisocyanates, and mixtures thereof. The polycarboxylic acids include two or more acid groups per molecule. Anhydrides may be prepared from these polycarboxylic acids. Preferably, the curing agent is a solid dicarboxylic acid. Suitable curing agents include 1,12-dodecanedioic acid (e.g., available from Invista, Wilmington, Del., or Cathay Biotechnology, Shanghai, China) and 1,3,4-butanetricarboxylic acid (e.g., available from Mitsubishi Chemicals, Inc., Tokyo, Japan). Descriptions of suitable curing agents are set forth in U.S. Pat. Nos. 5,270,416, 5,407,747, 6,077,608, 6,277,917, 6,359,067, and 6,479,588, the contents of which are herein incorporated by reference in their entirety.

Powder coating composition formed from resins of the present disclosure comprising the GMA resin and curing agent may also comprise additives suitable for powder coating compositions. Additives typically used in powder coating compositions are known to those of skill in the art. These additives can include pigments, fillers, light stabilizers, and antioxidants. Examples of the additives include curing catalysts, flow regulators, thixotropy regulators, antistatic agents, surface regulators, brighteners, anti-blocking agents, plasticizers, ultraviolet light absorbers, impact modifier, humidity regulators, anti-caking reducers, and degassers or anti-popping agents. All additives are blended in a range that does not substantially adversely affect the properties of the powder coatings comprising the GMA resins of the present invention. Specifically, these additives may include benzoin (volatiles release agent or anti-popping agent), Tinuvin 405 hydroxyphenyl triazine ultraviolet absorber (available from Ciba-Geigy Limited, Basel, Switzerland), Modaflow or Resiflow) flow additives (available from Cytec Surface Specialties, Inc., Smyrna, Ga., or Estron Chemical, Inc., Calvert City, Ky.), tertiary amine or N-alkylimidazole (curing catalysts), fumed silica to reduce caking sold as CAB-O-SIL (available from Cabot Corporation, Billerica, Mass.) and the like.

If color is desired, a sufficient amount of pigment may be added to the powder coating composition to provide the color desired. The amount of pigment used in the powder coating compositions generally is from 1 to 50 percent by weight based on the total weight of the composition. Suitable pigments include, for example, titanium dioxide, ultramarine blue, phthalocyanine blue, phthalocyanine green, carbon black, graphite fibrils, black iron oxide, chromium green oxide, ferric yellow, and quindo red.

Powder coating composition formed from resins of the present disclosure can be prepared by selecting the proper amounts of the components of the composition, including the GMA resin, curing agent, and optionally additives, and thoroughly premixing the components to form an essentially homogeneous mixture. All components of the powder coating composition can be mixed as powders by a dry-blending process or the components can be mixed by a semi-dry-blending process or melt-blending process. If melt-blended, after all components are appropriately blended, they are cooled, dried if necessary, and then crushed to a powder.

For instance, to prepare a powder coating composition formed from resins of the present disclosure, the components of the powder coating composition (i.e., the GMA resin, curing agent, and optionally additives) are premixed. Premixing of all components may be achieved by any suitable means. An illustrative small scale mixer is a Vitamixer blender of the Vitamix Corporation in Cleveland, Ohio. The premixed components are then placed in a heated extruder where the mixture is melt mixed and extruded. One type of extruder that can be used is an APV Model 19 PC twin screw extruder with two individually adjustable heating zones with a variable rotation rate that can provide an extrudate in ribbon form from between a pair of chilled pinch rolls. The extruded composition is then crushed into powder form by any suitable means, such as a hammer mill (or a Vitamixer blender for small quantities) and powder passing through a 140 or 170 mesh sieve is collected.

To apply the coating composition to a surface, conventional techniques can be used so as to obtain a smooth, substantially uniform coating. Typically it is desired that the coating have a thickness that is generally from about 1.0 to about 10 mils, preferably from about 2.0 to about 4.0 mils. The powder coating composition can be applied directly to an article or substrate, for example, metal such as steel or aluminum. The powder coating compositions can be applied directly upon bare surfaces or on previously treated surfaces. Preferably, the powder coating is a clearcoat for application over or with any basecoat formulation known to those skilled in the art. For instance, a clear coating can be applied to a previously color coated surface to provide a clear coating on the colored surface.

Application of the powder coating composition formed from resins of the present disclosure can be by spraying, and in the case of metal substrates by electrostatic spraying, or by the use of a fluidized bed. Spraying equipment is commercially available from manufacturers such as GEMA Volstatic of Indianapolis, Ind. and The Nordson Corp. of Amherst, Ohio. The powder coating can be applied in a single sweep or in several passes to provide a film with the desired thickness after curing.

Curing of the powder coating composition formed from resins of the present disclosure is achieved by heating the coated surface for a time sufficient to cure the composition. Although the specific curing conditions depend on the precise constituents of the composition, including the curing agent and the presence or absence of a curing catalyst, typical curing conditions without the presence of a curing catalyst are from about 15 to about 45 minutes at about 135° C. to 200° C. As an illustration, typical curing conditions for a cured coating of 2.5 mils (approximately 65 microns) is 30 minutes at 165° C.

By following the teachings of the present disclosure, the cured coating composition exhibits a smooth finish. The powder coating compositions are applied to an appropriate article or substrate and heated for 15 to about 45 minutes at about 135° C. to 200° C. to provide a cured coating on the article or substrate. The cured coatings formed from the powder coating compositions of the present invention exhibit an acceptable 600 gloss as measured by ASTM D523 as described in U.S. Pat. No. 5,436,311.

Control Resin Example

Ctl-R1

To a two gallon Parr reactor was charged 1930 grams of xylene that was stirred at 200 rpm. Air was eliminated by consecutively pressuring and depressurizing the reactor to 60 psig with dry nitrogen four times. The mixture was heated to 139 C., after which a mixture of 450 grams of styrene, 1020 grams of methyl methacrylate, 675 grams of n-butylacrylate, 855 grams of glycidylmethacrylate, 3 grams of n-dodecylmercaptan, as chain transfer agent, and 134.1 grams of t-butylperoctoate, as free radical initiator, was pumped into the reactor over 5 hours at 139° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C. The product solution was cooled down to 70° C. for discharging.

The product solution was then transferred to a three neck round bottom flask fitted for distillation and most of the xylene was distilled at 1 atmosphere. Vacuum was then applied while bringing the temperature up to 160° C. The molten material was stirred for 45 minutes at 167-173° C. and less than 4 mmHg and then poured into an aluminum pan to give a friable resin with a melt index of 50 grams per 10 minutes at 125° C. under 2160 grams load, a melt viscosity of 230 poise and an epoxy equivalent weight of 520. The melt viscosity was determined in accordance with ASTM D 4287 using an ICI model VR 4752 Cone & Plate Viscometer using a 0.77 inch diameter cone operating at a shear rate of 3600 sec-1. The epoxy equivalent weight was determined by the acetic acid/perchloric acid method using a Mettler Autotitrator DL25/Mettler 20 ml Buret DV920.

Control Resin Example

Ctl-R2

To a two gallon Parr reactor was charged 1286 grams of xylene that was stirred at 200 rpm. Air was eliminated by consecutively pressuring and depressurizing the reactor to 60 psig with dry nitrogen four times. The mixture was heated to 150° C., after which a mixture of 420 grams of styrene, 1200 grams of methyl methacrylate, 1380 grams of glycidyl methacrylate, and 123.00 grams of di-t-amyl peroxide were pumped into the reactor over 4 hours at 150° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C. The product solution was cooled down to 70° C. for discharging.

The product solution was then transferred to a three neck round bottom flask fitted for distillation and most of the xylene was distilled at 1 atmosphere. Vacuum was then applied while bringing the temperature up to 160° C. The molten material was stirred for 45 minutes at 160-165° C. and less than 4 mmHg and then poured into an aluminum pan to give a friable resin with a melt index of 100, epoxy equivalent weight of 315, and Mw of 5100.

Control Resin Example

Ctl-R3

To a two gallon Parr reactor was charged 1286 grams of xylene that was stirred at 200 rpm. Air was eliminated by consecutively pressuring and depressurizing the reactor to 60 psig with dry nitrogen four times. The mixture was heated to 160° C., after which a mixture of 660 grams of styrene, 1020 grams of methyl methacrylate, 810 grams of glycidyl methacrylate, 300 grams of isobornyl methacrylate, and 210 grams of butyl methacrylate, and 52.50 grams of di-t-amyl peroxide were pumped into the reactor over 4 hours at 160° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C. The product solution was then cooled down to 70° C. for discharging.

The product solution was transferred to a three neck round bottom flask fitted for distillation and most of the xylene distilled at 1 atmosphere. Vacuum was then applied while bringing the temperature up to 160° C. The molten material was stirred for 45 minutes at 160-165° C. and less than 4 mmHg and then poured into an aluminum pan to give a friable resin with a melt index of 27, epoxy equivalent weight of 533, and Mw of 6500.

Resin Example

Exp-R1

To a two gallon Parr reactor was charged 1286 grams of xylene that was stirred at 200 rpm. Air was eliminated by consecutively pressuring and depressurizing the reactor to 60 psig with dry nitrogen four times. The mixture was heated to 150° C., after which a mixture of 450 grams of styrene, 810 grams of methyl methacrylate, 1380 grams of glycidyl methacrylate, 360 grams of isobutyl methacrylate, and 123.00 grams of di-t-amyl peroxide were pumped into the reactor over 4 hours at 150° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C. The product solution was then cooled down to 70° C. for discharging.

The product solution was transferred to a three neck round bottom flask fitted for distillation and most of the xylene was distilled at 1 atmosphere. Vacuum was then applied while bringing the temperature up to 160° C. The molten material was stirred for 45 minutes at 160-165° C. and less than 4 mmHg and then poured into an aluminum pan to give a friable resin with a melt index of 100, epoxy equivalent weight of 320, and Mw of 5290.

Resin Example

Exp-R2

To a two gallon Parr reactor was charged 1286 grams of xylene that was stirred at 200 rpm. Air was eliminated by consecutively pressuring and depressurizing the reactor to 60 psig with dry nitrogen four times. The mixture was heated to 160° C., after which a mixture of 120 grams of styrene, 1020 grams of methyl methacrylate, 840 grams of glycidyl methacrylate, 660 grams of butyl methacrylate, 360 grams of isobornyl methacrylate, and 52.50 grams of di-t-amyl peroxide were pumped into the reactor over 4 hours at 160° C. and autogenous pressure. The charging pump and lines were rinsed with 100 grams of xylene and the polymer solution was allowed to cool to 130° C. over 15 minutes. A mixture of 60 grams xylene and 15 grams t-butylperoctoate was added over two hours as the temperature fell from 130° C. to 100° C. The pump and lines were rinsed with 10 grams of xylene and the polymer solution held for 30 minutes at 100° C. The product solution was then cooled down to 70° C. for discharging.

The product solution was transferred to a three neck round bottom flask fitted for distillation and most of the xylene was distilled at 1 atmosphere. Vacuum was then applied while bringing the temperature up to 160° C. The molten material was stirred for 45 minutes at 160-165° C. and less than 4 mmHg and then poured into an aluminum pan to give a friable resin with a melt index of 21, epoxy equivalent weight of 516, and Mw of 8400.

For all the above resin compositions, calculated Tgf, SP, and measured Mw, EEQ, f/M are listed in Table 2.

TABLE 2

| | Resin | | | | |
|---|---|---|---|---|---|
| | Ctl-R1 | Ctl-R2 | Ctl-R3 | Exp-R1 | Exp-R2 |
| Monomer Compositions | | | | | |
| GMA | 28.5% | 46.0% | 27.0% | 46.0% | 28.0% |
| IBMA | — | — | — | 12.0% | — |
| IBOMA | — | — | 10.0% | — | 12.0% |
| MMA | 34.0% | 40.0% | 34.0% | 27.0% | 34.0% |
| Styrene | 15.0% | 14.0% | 22.0% | 15.0% | 4.0% |
| nBMA | 22.5% | — | 7.0% | — | 22.0% |
| Calculated | | | | | |
| Tgf (° C.) | 64.5 | 74.8 | 84.1 | 68.0 | 71.1 |
| SP $(cal/cm^3)^{1/2}$ | 9.19 | 9.35 | 9.10 | 9.03 | 9.11 |
| Measured | | | | | |
| Mw | 8400 | 5100 | 6500 | 5290 | 8400 |
| EEQ | 525 | 315 | 533 | 320 | 516 |
| f/M | 16.0 | 16.2 | 12.2 | 16.5 | 16.3 |

Control Coating Example

Ctl-C1

A clear control coating composition was prepared using 290.05 grams of the control resin Ctl-R1, 59.96 grams of 1,12-dodecanedioic acid, 1.75 grams of benzoin, 8.08 grams of Modaflow Powder III, 7 grams of Tinuvin 405, and 3.5 grams of Tinuvin 144. After premixing in a high speed food blender, this composition was melt mixed in extruder at 115° C. and 300 rpm. The cooled extrudate was ground and sieved to 170 mesh and electrostatically sprayed onto 4×12 inch zinc phosphated steel panels and cured for 30 minutes at 163° C. The resulting clear coating, having an applied thickness of 2.5 mil, exhibited the general properties summarized in Table 3.

The general properties summarized in Table 3 were evaluated according to the following methods.

Gloss: The gloss was represented by a value (gloss at 60°) measured by a glossmeter, such as Byk-Gardner's Micro-Tri-Gloss, catalogue no. 4522.

Smoothness: evaluated wherein 1=least smooth and 10=smoothest

MEK Resistance: Inspect coating surface after 100 double rub by cloth soaked with Methyl Ethyl Ketone (MEK).

Mar Resistance: A mar test was conducted by rubbing the surface of the coating using a Crockmeter (Model CM-5, made by ATLAS Electrical Devices Co.) with a powder cleanser as the rubbing media, and gloss (gloss at 60°) was evaluated before and after the rubbing. The gloss retention was calculated, and the mar resistance was a measure of the gloss retention.

Acid Etch Resistance: Measure the time to mark coating surface by 40% $H_2SO_4$ at 60° C.

Other Coating Examples

All the other coating examples in this disclosure, Ctl-R2, Ctl-R3, Exp-R1, and Exp-R2 were prepared by the same manner as the above Ctl-C1. The resulting clear coatings had the properties shown in Table 3.

TABLE 3

| | Coating | | | | |
|---|---|---|---|---|---|
| | Ctl-C1 | Ctl-C2 | Ctl-C3 | Exp-C1 | Exp-C2 |
| Composition | | | | | |
| Ctl-R1 | 82.82 | — | — | — | — |
| Ctl-R2 | — | 74.23 | — | — | — |
| Ctl-R3 | — | — | 83.00 | — | — |
| Exp-R1 | — | — | — | 75.57 | — |
| Exp-R2 | — | — | — | — | 82.38 |
| DDDA | 17.18 | 25.77 | 17.00 | 24.43 | 17.62 |
| Tinuvin-405 | 2.0 | 2.0 | 2.0 | 2.0 | 2.0 |
| Tinuvin-144 | 1.0 | 1.0 | 1.0 | 1.0 | 1.0 |
| ModaflowIII | 2.3 | 2.3 | 2.3 | 2.3 | 2.3 |
| Benzoin | 0.5 | 0.5 | 0.5 | 0.5 | 0.5 |
| Coating Properties | | | | | |
| Gloss | 87.5/96.3 | 84.9/95.8 | 89.7/97.9 | 7.6/97.5 | 88.4/98.3 |
| Smoothness | 9 | 9 | 9 | 9 | 9 |
| MEK Resistance | Good | Excellent | Good | Excellent | Good |
| Mar Resistance | 23 | 41 | 21 | 49 | 39 |
| Acid Etch Resistance | 14 min. | 2 min. | 24 min. | 10 min. | 16 min. |

Although the present disclosure has been described with reference to certain preferred embodiments, it is apparent that modifications and variations thereof may be made by those skilled in the art without departing from the scope of the disclosure as defined by the following claims.

We claim:

1. A resin suitable for powder coating prepared from monomers comprising from 20 to 55 weight % of glycidyl acrylate or glycidyl methacrylate, from 3 to 20 weight % of at least one selected from the group consisting of isobutyl methacrylate, and isobornyl methacrylate, and from 25 to 65 weight % of at least one copolymerizable ethylenically unsaturated monomer,
   wherein the resin has a f/M value greater than 14 and,
   wherein the resin has a calculated solubility parameter of from 8.8 to 9.12.

2. The resin of claim 1 wherein the resin has a calculated glass transition temperature of from 60 to 90° C.

3. The resin of claim 1 wherein the resin has a weight average molecular weight of from 3,000 to 12,000.

4. The resin of claim 1 wherein the resin has an equivalent epoxy weight of from 250 to 720.

5. The resin of claim 1 wherein the resin is prepared from monomers comprising from 25 to 50 weight % of glycidyl acrylate or glycidyl methacrylate, from 5 to 15 weight % of at least one selected from the group consisting of isobutyl methacrylate, and isobornyl methacrylate, and from 30 to 50 weight % of at least one copolymerizable ethylenically unsaturated monomer.

6. The resin of claim 5 wherein the resin is prepared from glycidyl methacrylate, isobornyl methacrylate, and copolymerizable ethylenically unsaturated monomers comprising methyl methacrylate and styrene.

7. The resin of claim 1 wherein the resin has an f/M value of from greater than 14 to 22.

8. The resin of claim 1 wherein the resin has an f/M value of from 15 to 20.

9. The resin of claim 1 wherein the resin has a calculated glass transition temperature of from 65 to 85° C.

10. The resin of claim 1 wherein the resin has a calculated solubility parameter of from 9.0 to 9.12.

11. The resin of claim 1 wherein the resin has a weight average molecular weight of from 4,000 to 10,000.

12. The resin of claim 1 wherein the resin has an equivalent epoxy weight of from 280 to 600.

13. The resin of claim 1 wherein in the resin is in particulate form.

14. The resin of claim 13 wherein the resin has a particle size of from 100 microns to 6 mm.

15. A resin suitable for powder coating prepared from monomers comprising from 20 to 55 weight % of glycidyl acrylate or glycidyl methacrylate, from 5 to 15 weight % of at least one selected from the group consisting of isobutyl methacrylate, and isobornyl methacrylate, and from 25 to 65 weight % of at least one copolymerizable ethylenically unsaturated monomer, wherein the resin has a f/M value of 15-20, wherein the resin has a calculated solubility parameter of from 9.0 to 9.12.

16. The resin of claim 15 wherein the resin has a weight average molecular weight of from 3,000 to 12,000.

17. The resin of claim 15 wherein the resin has a weight average molecular weight of from 4,000 to 10,000.

18. The resin of claim 15 wherein the resin has an equivalent epoxy weight of from 250 to 720.

19. The resin of claim 15 wherein the resin has an equivalent epoxy weight of from 280 to 600.

20. The resin of claim 15 wherein the resin is prepared from monomers comprising from 25 to 46 weight % of glycidyl acrylate or glycidyl methacrylate.

21. The resin of claim 1 wherein the resin is prepared from monomers comprising from 25 to 46 weight % of glycidyl acrylate or glycidyl methacrylate.

* * * * *